(12) United States Patent
Dean

(10) Patent No.: US 7,326,758 B2
(45) Date of Patent: Feb. 5, 2008

(54) ETHYLENE COPOLYMER WITH FLUORINE-CONTAINING GRAFT AND A PROCESS FOR PREPARING SAME

(75) Inventor: David M. Dean, West Chester, PA (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 353 days.

(21) Appl. No.: 10/525,675

(22) PCT Filed: Oct. 29, 2003

(86) PCT No.: PCT/US03/34735

§ 371 (c)(1),
(2), (4) Date: Feb. 18, 2005

(87) PCT Pub. No.: WO2004/039849

PCT Pub. Date: May 13, 2004

(65) Prior Publication Data

US 2006/0105655 A1    May 18, 2006

Related U.S. Application Data

(60) Provisional application No. 60/421,946, filed on Oct. 29, 2002.

(51) Int. Cl.
*C08F 12/20*    (2006.01)

(52) U.S. Cl. .................. 526/242; 526/317.1; 526/352; 526/348

(58) Field of Classification Search ............. 526/317.1, 526/242, 373, 352, 348
See application file for complete search history.

(56) References Cited

U.S. PATENT DOCUMENTS

| 2,803,615 | A |   | 8/1957  | Ahlbrecht et al. |        |
|-----------|---|---|---------|------------------|--------|
| 3,277,039 | A |   | 10/1966 | Merascia et al.  |        |
| 5,025,053 | A |   | 6/1991  | Crater et al.    |        |
| 5,141,661 | A | * | 8/1992  | DeRosa et al.    | 508/224 |
| 5,350,557 | A |   | 9/1994  | Jarrabet et al.  |        |
| 5,380,778 | A |   | 1/1995  | Buckanin         |        |
| 5,536,304 | A |   | 7/1996  | Coppens et al.   |        |

FOREIGN PATENT DOCUMENTS

WO    WO 02/072648 A2 *   9/2002

* cited by examiner

Primary Examiner—Ling-Sui Choi

(57) ABSTRACT

The present invention is fluorine-containing ethylene copolymer composition and a process of preparing same. The ethylene copolymers of the present invention are melt processible fluorinated copolymers having surface energies of less than about 25 dynes/cm.

16 Claims, No Drawings

ETHYLENE COPOLYMER WITH FLUORINE-CONTAINING GRAFT AND A PROCESS FOR PREPARING SAME

This application claims the benefit of U.S. Provisional Application No. 60/421,946, filed Oct. 29, 2002.

BACKGROUND OF THE INVENTION

1. Field of the Invention

The present invention relates to fluorine-containing ethylene copolymer compositions having grafted fluorine-containing functionality. The present invention also relates to polymer blends obtained from fluorine-containing ethylene copolymers described herein. The present invention also relates to a process for preparing the fluorine-containing ethylene copolymers of the present invention.

2. Discussion of the Related Art

Fluoropolymer compositions are widely used for surface modification, as agents to impart desirable surface properties to various types of surfaces. For example, fluoropolymer compositions can impart or enhance the water and oil repellency of certain surfaces, including fabrics and upholstery. However, surface treatment using fluoropolymers can involve complex processing steps to ensure that the fluoropolymer is applied and bonded to the surface being treated. The process can be difficult and expensive. Organic solvent vapors can be released to the atmosphere during the processing. Surface treatment can involve high temperature curing of the fluoropolymer to the substrate surface.

To impart water and oil repellency, fluorochemicals or fluoropolymers can be dissolved or dispersed either in organic solvents or in water. For example, mixtures of fluorinated copolymers, mainly comprising perfluoroalkyl methacrylate, and vinyl copolymers are disclosed in U.S. Pat. No. 3,277,039. U.S. Pat. No. 2,803,615 discloses acrylate/methacrylate esters of N-alkyl or N-alkanol perfluoroalkanesulfonamides used to impart grease and oil repellency. Fluorochemical compositions for treating textile fibers and fabrics comprising an aqueous solution or dispersion of a fluorochemical acrylate and a polyalkoxylated polyurethane having pendant perfluoroalkyl groups is described in U.S. Pat. No. 5,350,557. U.S. Pat. No. 5,536,304 describes a composition for imparting water and oil repellency comprising a fluoroaliphatic radical containing agent, and a cyclic carboxylic acid anhydride-containing polysiloxane.

Fluorochemicals can be melt-blended with thermoplastic polymers, and thereby impart water and oil repellency to the polymer by migrating to the polymer surface as described in, for example, U.S. Pat. No. 5,025,052, wherein the preparation of fluoroaliphatic radical-containing oxazolidinone compositions for blending with thermoplastic polymers is described. U.S. Pat. No. 5,380,778 describes thermoplastic compositions comprising fluoroaliphatic radical containing aminoalcohols and a thermoplastic synthetic organic polymer.

Ethylene copolymers are useful polymeric materials in many applications. Ethylene copolymers can find use in applications such as packaging, laminate films, and adhesives for example. Conventional polyolefins such as polypropylene, polyethylene, and conventional ethylene copolymers have high surface tension relative to fluoropolymers such as polytetrafluoroethylene, for example. As a result, for applications wherein water and oil repellency is important, articles made from polyolefins must be treated to attain a satisfactory level of repellency. However, due to their relatively low melting point and lack of reactive functional groups, treatment of polyolefins with fluorochemicals or fluoropolymers is, in general, much more difficult than treating other thermoplastic polymers.

Copolymers of ethylene and fluorine-containing monomers are known. For example, Tefzel®, manufactured by E.I DuPont de Nemours and Company, is a copolymer of ethylene and tetrafluoroethylene. Copolymers of this type are very different from conventional polyethylene copolymers in many aspects. For example, fluorine-containing ethylene copolymers are typically melt-processable only at much higher temperature than conventional ethylene polymers and ethylene copolymers, and the properties of fluorine-containing ethylene copolymers differ form conventional ethylene copolymers. Copolymers of this type are not amenable to manufacture or processing under the type of conditions used to manufacture and process conventional ethylene copolymers. Ethylene/fluoromonomer copolymers of this type are not compatible in systems that currently use polyethylene copolymers. For example, known conventional ethylene/tetrafluoroethylene copolymers have no adhesion to polyethylene.

It would be desirable to have a fluorine-containing ethylene copolymer that can be processed in the same way as conventional ethylene copolymers. It would be desirable to have a melt-processable fluorine-containing ethylene copolymer. It would be desirable to have a fluorine-containing ethylene copolymer that has a low surface tension. It would be desirable to have a fluorine-containing ethylene copolymer that can be compatible with, or used in place of conventional ethylene copolymers.

SUMMARY OF THE INVENTION

In one aspect, the present invention is a fluorine-containing ethylene copolymer composition comprising: the product of the reaction between an ethylene/glycidyl (meth) acrylate copolymer and a fluorine-containing carboxylic acid.

In still another aspect, the present invention is a blend comprising at least two thermoplastic materials wherein at least one is a fluorine-containing ethylene copolymer composition comprising the product of the reaction between an ethylene/glycidyl (meth)acrylate copolymer and a fluorine-containing carboxylic acid.

In another aspect, the present invention is an article having a surface with a total surface energy of less than 25 dyne/cm comprising: a fluorine-containing ethylene copolymer composition comprising the product of the reaction between an ethylene/glycidyl (meth)acrylate copolymer and a fluorine-containing carboxylic acid.

In another aspect, the present invention is a stain-resistant fiber comprising a fluorine-containing ethylene copolymer composition comprising the product of the reaction between an ethylene/glycidyl (meth)acrylate copolymer and a fluorine-containing carboxylic acid.

In still another aspect, the present invention is an article formed by injection molding or by extrusion comprising a fluorine-containing ethylene copolymer composition comprising the product of the reaction between an ethylene/ glycidyl (meth)acrylate copolymer and a fluorine-containing carboxylic acid.

In still another aspect the present invention is a mold release additive comprising a fluorine-containing ethylene copolymer composition comprising the product of the reaction between an ethylene/glycidyl (meth)acrylate copolymer and a fluorine-containing carboxylic acid.

DETAILED DESCRIPTION OF THE INVENTION

In one embodiment, the present invention is a composition comprising a fluorine-containing ethylene copolymer. The fluorine-containing ethylene copolymer of the present invention can be obtained, for example, by the process of reactive melt compounding a glycidyl methacrylate containing ethylene copolymer with a fluorine-containing material that also includes carboxylic acid functionality. Reactive melt compounding, as the term is used herein, includes any process whereby reactive components are combined and reacted at temperatures above the melting point of all of the reactive components. Reactive melt compounding does not require the presence of a solvent.

Suitable EGMA copolymers are copolymers obtained by copolymerization of glycidyl methacrylate with ethylene. EGMA copolymers suitable for the present invention have a weight average molecular weight ($M_w$) of at least 50,000. Preferably the $M_w$ of EGMA copolymers suitable for use herein is in the range of from about 60,000 to about 200,000, more preferably in the range of from about 70,000 to about 150,000, and most preferably in the range of from about 80,000 to about 120,000. Suitable ethylene/glycidyl methacrylate copolymers (EGMA copolymers) can be obtained commercially from, for example, Aldrich Chemical Co.

EGMA copolymers suitable for use herein comprise from about 0.5 wt % GMA to about 30 wt %. Preferably EGMA copolymers comprise from about 2 wt % to about 18 wt % GMA, and more preferably from about 5 wt % to about 15 wt %. Most preferably EGMA copolymers comprise from about 6 wt % to about 12 wt % GMA.

Also EGMA copolymers suitable for use herein are terpolymers comprising ethylene, GMA and a third comonomer. Suitable third comonomers are selected from unsaturated carboxylic esters having from 3 to 12 carbons. Suitable third comonomers include, for example: n-butyl acrylate (nBA); methyl (meth)acrylate (M(M)A); ethyl (meth)acrylate; isobutyl acrylate (iBA); and vinyl acetate (VA). Methacrylate esters, for the purposes of the present invention, are suitable equivalents for acrylate esters for all purposes of the present invention. In the present invention a shorthand notation for "methacrylate and/or acrylate" can be either (meth)acrylate or, alternatively, (M)A. For example, in the present application, a shorthand notation for "methyl methacrylate and/or methyl acrylate" can be either "methyl (meth)acrylate" or, alternatively, "M(M)A".

EGMA copolymers are reacted with fluorinated compounds having carboxylic acid functionality to yield the fluorine-containing ethylene copolymers of the present invention. Suitable fluorine containing carboxylic acids are any such acids that can, after reaction with an EGMA copolymer or terpolymer, yield copolymers having surface energies of preferably less than about 25 dyne/cm. Perfluorocarboxylic acids and perfluoropolyether carboxylic acids are preferred in the practice of the present invention. Suitable perfluorinated carboxylic acids can have from 2 to 30 carbon atoms, preferably from 4 to 24 carbons, more preferably from 6 to 20 carbons, and most preferably from 6 to 18 carbons. Suitable acids include, for example: perfluoro nonanoic acid (PFNON); perfluoro octanoic acid (PFOCT); perfluoro heptanoic acid (PFHEP); perfluoro hexanoic acid (PFHEX). Perfluoropolyether carboxylic acids (PFPE) suitable for use in the practice of the present invention include PFPE of the general formula:

wherein n is an integer in the range of from about 5 to about 50. Preferably n is in the range of from about 12 to about 26, more preferably in the range of from about 14 to about 24, and most preferably in the range of from about 16 to about 22. A suitable PFPE, for example, is α-(1carboxy-1,222-tetrafluoroethyl)-ω-[tetrafluoro(trifluoromethyl)ethoxy] poly[oxy[trifluoro(trifluormethyl)-1,2-ethanediyl]], which can be purchased commercially from E.I. DuPont de Nemours and Company under the tradename of Krytox® 157FS.

EGMA copolymers can be reacted with suitable fluorine-containing carboxylic acids by reacting the components in the melt, that is, at a temperature above the melting range of both reactants. Melt blending or coextrusion of the components results in the acid-catalyzed ring opening of the three member heterocyclic ring (epoxide) of the GMA moiety to yield a perfluoroester of glycerol grafted to the ethylene copolymer (grafted fluoroester copolymer, or GFEC). A GFEC of the present invention can have a general formula as defined in any of Structures 1-3 below.

Structure 1:

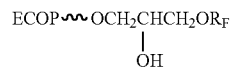

Structure 2:

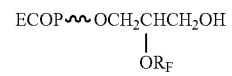

Structure 3:

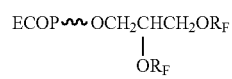

wherein:
ECOP is the ethylene copolymer backbone;
$R_F$ is a fluorine-containing acyl group suitable for use in the practice of the present invention.

A fluorine-containing ethylene copolymer product of the reaction as described herein can be a complex mixture of any of the above structures, in addition to other reaction products obtained according to the process described herein, in addition to unreacted starting materials. A composition of the present invention comprises GFEC having any of Structures 1, 2 or 3 either individually present or present in any combination, in an amount of at least about 15 wt % of the total composition. Preferably, the GFEC comprises at least about 20 wt % of the total composition. More preferably the GFEC comprises at least about 25 wt %, and most preferably at least about 30 wt % of the composition. Of the GFEC present, preferably Structure 3 comprises less than 10 wt % of the combined total weight of the GFEC, more preferably less than 5 wt %, and most preferably less than 2 wt %.

In another embodiment, the present invention is a process for preparing a GFEC of the present invention. As noted hereinabove, a GFEC of the present invention can be obtained by reactive melt compounding a suitable glycidyl methacrylate-containing ethylene copolymer and a suitable fluorine-containing carboxylic acid. For a melt compounding process according to the present invention, the components are preferably combined at a temperature above about 160° C. but less than about 250° C. The components can be blended in the melt using conventional mixing means, such as a Haake mixer, for example. The components can also be coextruded in the melt (reactive coextrusion) to obtain the GFEC product of the present invention.

EXAMPLES

The Examples and the Comparative Examples described herein are for illustrative purposes only, and not meant to limit the scope of the present invention in any manner.

Example 1

A mixture of 80.3 wt % EGMA copolymer (8 wt % GMA) and 19.7 wt % PFNON was heated to a temperature of 180° C. and blended in a Haake mixer for 10 minutes. The resulting material was then pressed between two Teflon® FEP plates at 180° C. for 10 minutes to form 10 mil thick films which were then cut into pieces. The film pieces were washed in an acetone bath for 2 days, and then rinsed for 1 minute in acetone and dried at room temperature. The film samples were analyzed by infra red (IR) spectroscopy to show absorption in the region of 1787 cm$^{-1}$, indicative of the carbonyl absorption of a perfluoroester group. The surface energy was analyzed and is reported in Table 1.

Examples 2-6

The process of Example 1 was repeated using the components in Table 1.

Comparative Examples 1-3

The procedure of Example 1 was repeated with the starting polymers indicated in Table 1, without added grafting agent.

TABLE 1

| Example | Surface Energy Measurements of 10 mil Compression Molded Film | | |
|---|---|---|---|
| | Starting Polymer | Grafting Agent | Total Surface Energy (dyne/cm) |
| Comparative 1 | Teflon ® FEP | None | 19.1 |
| Comparative 2 | DPE 2020 | None | 33.8 |
| Comparative 3 | E/8 wt % GMA | None | 27.6 |
| Ex 1 | E/8 wt % GMA | 19.7 wt % PFNON | 19.2 |
| Ex 2 | E/8 wt % GMA | 5.9 wt % PFPE | 20.8 |
| Ex 3 | E/8 wt % GMA | 11.1 wt % PFPE | 16.6 |
| Ex 4 | E/8 wt % GMA | 17.9 wt % PFOCT | 20.8 |
| Ex 5 | E/8 wt % GMA | 16.1 wt % PFHEP | 23.4 |
| Ex 6 | E/8 wt % GMA | 14.2 wt % PFHEX | 20.5 |

What is claimed is:

1. A fluorine-containing ethylene graft copolymer composition comprising: the grafted copolymer that is the product of the reaction between an ethylene copolymer selected from the group consisting of ethylene glycidyl acrylate copolymers and ethylene glycidyl methacrylate copolymers and a fluorine-containing grafting agent selected from the group consisting of fluorinated carboxylic acids, perfluorinated carboxylic acids and perfluoro polyether carboxylic acids of the formula $$CF_3-[CF(CF_3)-CF_2-O-]_nCF_2CO_2H,$$

wherein n is an integer from about 5 to about 50.

2. A fluorine-containing ethylene graft copolymer composition of claim 1 characterized in that the grafted copolymer absorbs light in the region of from about 1750 cm$^{-1}$ to about 1800 cm$^{-1}$ of the infra red absorption spectrum.

3. A fluorine-containing ethylene graft copolymer composition of claim 1 wherein the ethylene copolymer comprises copolymerized units of i) ethylene, ii) a second monomer selected from the group consisting of glycidyl acrylate and glycidyl methacrylate and iii) a third monomer selected from the group consisting of esters of unsaturated carboxylic acids having from 3 to 12 carbon atoms and vinyl acetate.

4. A composition of claim 3 wherein said third monomer is an ester selected from the group consisting of acrylic acid esters and methacrylic acid esters.

5. A composition of claim 3 wherein said third monomer is vinyl acetate.

6. A composition of claim 1 wherein said fluorine-containing perfluoro polyether carboxylic acid is an acid of the formula $$CF_3-[CF(CF_3)-CF_2-O-]_nCF_2CO_2H,$$

where n is an integer from 12 to 26.

7. A blend comprising at least two thermoplastic materials wherein at least one is a fluorine-containing ethylene graft copolymer composition of claim 1.

8. A blend comprising at least two thermoplastic materials wherein at least one is a fluorine-containing ethylene graft copolymer composition of claim 2.

9. An article having a surface with a total surface energy of less than 25 dyne/cm comprising: a fluorine-containing ethylene graft copolymer composition of claim 1.

10. An article having a surface with a total surface energy of less than 25 dyne/cm comprising: a fluorine-containing ethylene graft copolymer composition of claim 2.

11. An article formed by injection molding or by extrusion comprising a fluorine-containing ethylene graft copolymer of claim 1.

12. An article formed by injection molding or by extrusion comprising a fluorine-containing ethylene graft copolymer composition of claim 2.

13. A stain-resistant fiber comprising a fluorine-containing ethylene graft copolymer composition of claim 1.

14. A stain-resistant fiber comprising a fluorine-containing ethylene graft copolymer composition of claim 2.

15. A mold release additive comprising a fluorine-containing ethylene graft copolymer composition of claim 1.

16. A mold release additive comprising a fluorine-containing ethylene graft copolymer composition of claim 2.

* * * * *